United States Patent [19]

Lounds

[11] Patent Number: 4,640,324
[45] Date of Patent: Feb. 3, 1987

[54] ROUTER ATTACHMENT

[76] Inventor: Bernard C. Lounds, P.O. Box 403, Holt, Mich. 48842

[21] Appl. No.: 775,376

[22] Filed: Sep. 12, 1985

[51] Int. Cl.$^4$ .............................................. B27C 5/10
[52] U.S. Cl. ........................... 144/134 D; 144/144 R; 144/137; 409/182
[58] Field of Search .......... 144/134 A, 134 D, 136 C, 144/144 R; 409/110, 178, 179, 180, 182

[56] References Cited

U.S. PATENT DOCUMENTS

| | | | |
|---|---|---|---|
| 2,722,957 | 11/1955 | Marvosh | 144/134 A |
| 3,207,193 | 9/1965 | Godfrey et al. | 144/144 R |
| 3,332,462 | 7/1967 | Williams | 144/144 R |
| 3,376,787 | 4/1968 | Morganson | 144/134 D |
| 3,635,268 | 1/1972 | Longe | 144/134 D |
| 3,716,085 | 2/1973 | Wing | 409/79 |
| 3,913,447 | 10/1975 | Roche | 409/138 |
| 3,981,226 | 9/1976 | White | 144/134 D |
| 4,102,370 | 7/1978 | Vess | 144/134 D |
| 4,143,691 | 3/1979 | Robinson | 144/134 D |
| 4,252,164 | 2/1981 | Norlander | 144/134 D |
| 4,319,860 | 3/1982 | Beares | 144/134 D |
| 4,323,100 | 4/1982 | Silken | 144/134 D |

OTHER PUBLICATIONS

Brochure entitled "Betterley Underscribe", dated May 1, 1983.
Brochure entitled "Betterley Seaming Router", dated May 1, 1983.

Primary Examiner—W. D. Bray
Attorney, Agent, or Firm—Merchant, Gould, Smith, Edell, Welter and Schmidt

[57] ABSTRACT

An attachment (10) to facilitate precise cutting of a sheet of inlay material (26) with a router (12) to fit a cutout in a sheet of underlying material (28) comprises a top plate (30) and a spaced-apart bottom plate (32) defining a slot (34) for receiving the sheet of inlay material to be cut. The router (12) is mounted in a collar (42) adjustably secured to the top plate (30) over a clearance hole (40). A rotatable cam (76) is mounted in the bottom plate (32) beneath the clearance opening (40) in the top plate (30). The rotatable cam (76) includes an offset depending cam follower (78) which follows the edge of the cutout in the sheet of underlying material (28) so that a matching edge can be cut in the sheet of inlay material (26) for precise patching and inlay work.

16 Claims, 7 Drawing Figures

ROUTER ATTACHMENT

TECHNICAL FIELD

The present invention relates generally to an attachment for a hand-held power tool. More particularly, this invention concerns a router attachment adapted to facilitate cutting of sheet material matching the contour of an edge in another piece of sheet material, such as in patching or inlay work, to form precise seams of virtually any shape.

BACKGROUND ART

A router is a type of power tool which is commonly used to make cuts of predetermined depth into the surface of a workpiece, or to finish the ends or edges of workpieces to be joined at a seam or joint. A router generally consists of a cutting bit driven by a motor supported in a housing attached to a base plate, which rests on the workpiece. The router is usually adjustable to make a cut of the desired depth and can be manipulated as necessary to form a cut of the desired shape in the workpiece.

Various attachments for guiding routers have been available heretofore. For example, U.S. Pat. Nos. 4,143,691 and 3,716,085 relate to attachments to facilitate cutting arcs in workpieces. U.S. Pat. Nos. 4,323,100 and 3,635,268 show guides for making circular cuts of different radii. U.S. Pat. No. 4,252,164 shows an attachment for cutting an end of circular cross section onto a rectangular workpiece. U.S. Pat. No. 4,102,370 shows an attachment for continuous depth of cut adjustment. U.S. Pat. No. 3,913,447 illustrates a guide for mitering the end of a workpiece. U.S. Pat. No. 3,376,787 shows an attachment for guiding a router along an irregular or curved workpiece edge. U.S. Pat. No. 3,332,462 shows an attachment for template routing.

Of the various router attachments and guides available, however, I am aware of only one router attachment which is particularly adapted for forming precise joints and seams with inlay material. These attachments are available from Art Betterley Enterprises, Inc., of Blaine, Minn. They include an adjustable bottom plate which defines with the base plate of the router a slot for receiving the edge of a sheet of laminate to be cut. The base plate includes a fixed follower comprising a lateral straight locating edge or lip which follows along the edge of the adjoining piece to cut the laminate to fit. The Betterley attachment, however, is adapted for use with straight seams and is neither adapted nor intended for cutting arcuate joints of inside or outside curvature.

There is thus a need for an improved router attachment which can be used with either straight seams or arcuate seams, of inside or outside curvature, to form precise seams and joints of the type required in patching and inlay work.

SUMMARY OF INVENTION

The present invention comprises a router attachment which overcomes the foregoing and other difficulties associated with the prior art. In accordance with the invention, there is provided an attachment for use with a hand-held router to facilitate cutting of precise seams of virtually any shape particularly in inlay work. The attachment herein comprises a pair of vertically spaced-apart plates defining a generally horizontal opening for receiving a sheet of inlay material. A collar is mounted on the top plate for supporting a router and its bit for vertical movement relative to a clearance hole in the top plate, which is centered over an offset rotatable cam follower in the bottom plate. The mounting collar is preferably secured to the top plate for lateral adjustability for vertically aligning the outer edge of the router bit with the inner edge of the cam follower so that a cut of corresponding contour in the inlay material will be formed as the cam follower is guided along the edge or seam to be matched in the underlying sheet of base material. In the preferred embodiment, the router is secured to the mounting collar by means of an adjustable depth ring and slotted guide sleeve on the router, and a pair of guide pins and thumb latches on the mounting collar, to facilitate precise positioning of the router bit into and out of cutting position with the inlay sheet for plunge cuts and the like.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
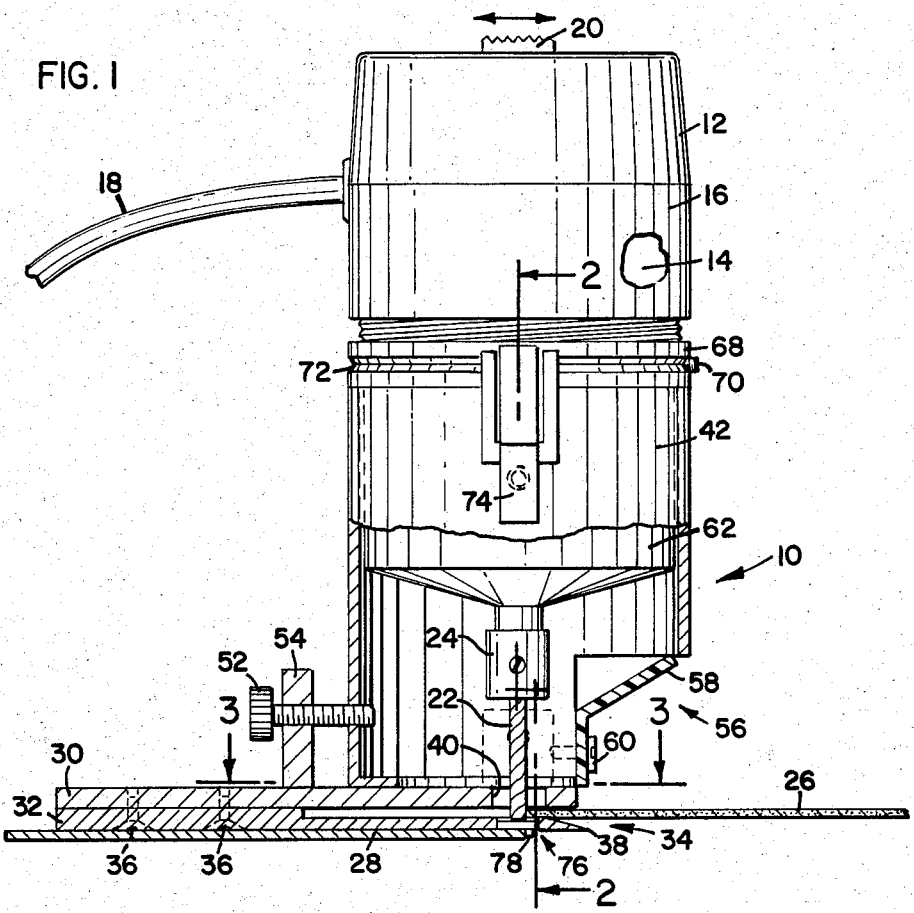
FIG. 1 is a side view of a router with the attachment of the present invention.

Referring now to the Drawings, wherein like reference numerals designate like or corresponding elements throughout the views, and particularly referring to FIG. 1, there is shown the router attachment 10 of the invention. The attachment 10 is shown with a hand-held router 12 which is of substantially conventional construction. The router 12 generally includes an electric motor 14, a housing 16, a power supply cord 18, and an on/off switch 20. A cutting bit 22 is secured to the end of the drive shaft or spindle 24 of the motor 14. The attachment 10 can be utilized with any router 12 of suitable construction, such as those available from Porter Cable Corporation of Jackson, Tenn.

As will be explained more fully hereinafter, the router attachment 10 is particularly adapted for cutting a sheet of material 26 to match the contour of an edge in an underlying sheet of material 28. Attachment 10 can be used for precise inlay or patching work. For example, sheet 26 can comprise a sheet of inlay material or veneer to be cut and laid into a cutout in a sheet of laminate comprising sheet 28, such as in cabinetry. Sheet 26 could also comprise a sheet of aluminum or fiberglass to be cut to match a cutout another sheet of similar material, such as in patching a boat hull or an aircraft skin.

Figure 2:
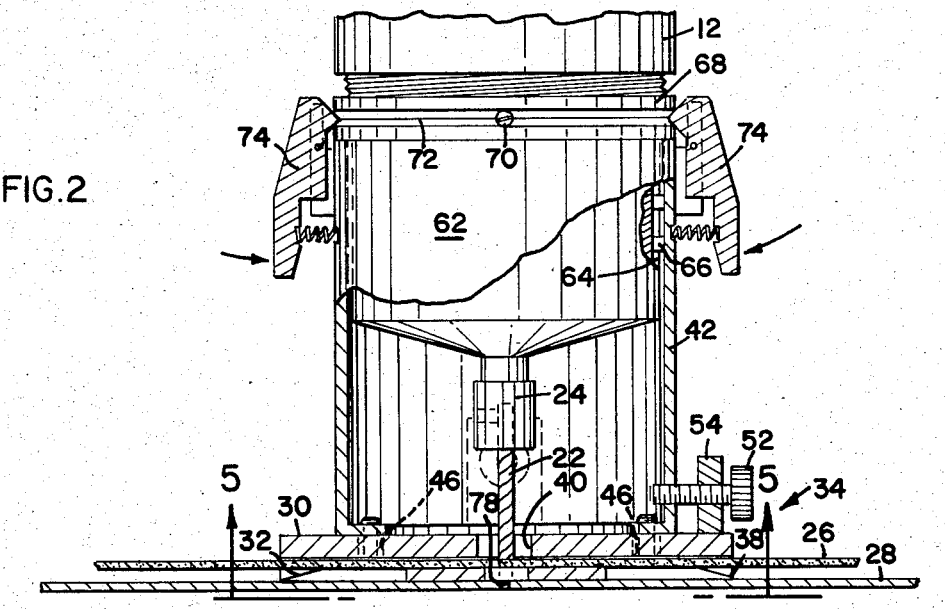
FIGS. 2 and 3 are cross-sectional views taken along lines 2—2 and 3—3, respectively, of FIG. 1 in the direction of the arrows.
Figure 3:
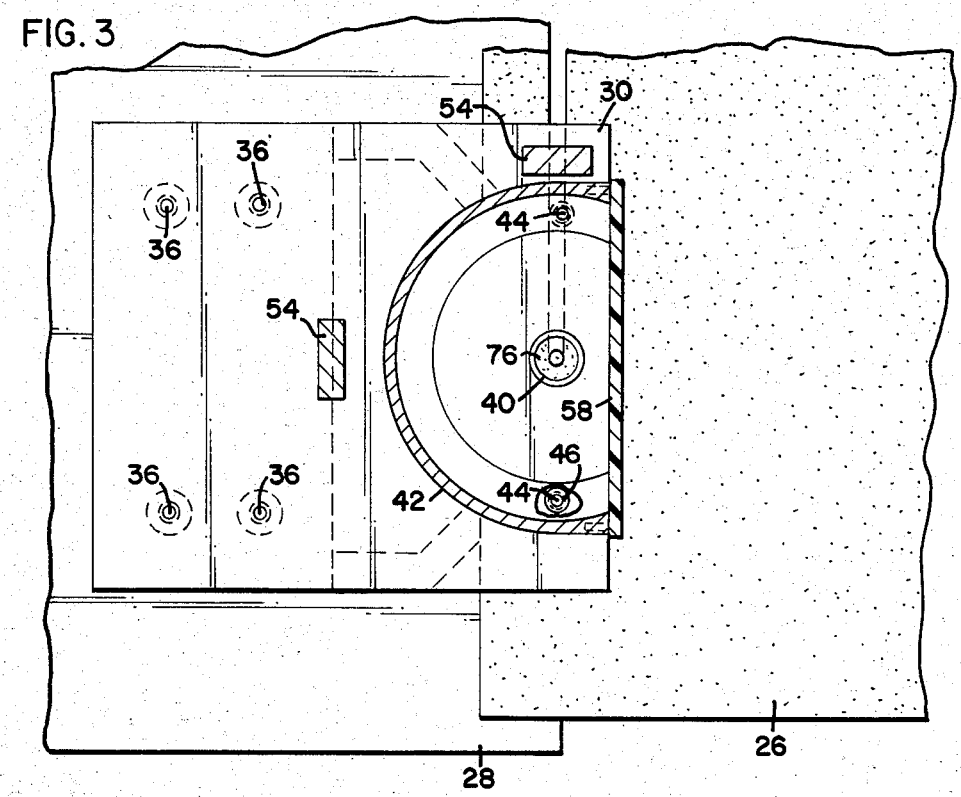
Figure 4:
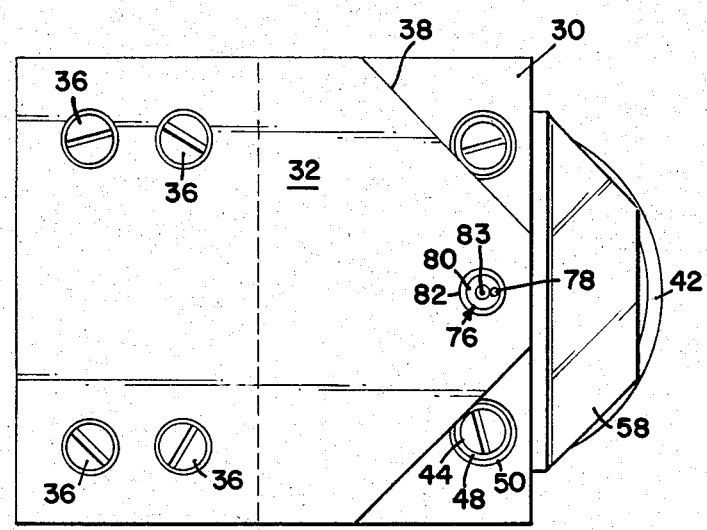
FIG. 4 is a cross-sectional view taken along line 4—4 of FIG. 2 in the direction of the arrows.

The constructional details of the router attachment 10 are shown in FIGS. 2-4. The attachment 10 comprises a pair of vertically spaced-apart plates 30 and 32 defining a generally horizontal slot 34 between the plates. The plates 30 and 32 can be formed of aluminum or other suitable material, secured together at the closed end of slot 34 by screws 36 or other suitable fasteners. As illustrated, the top plate 30 is of generally rectangular shape, while the bottom plate 32 is of generally rectangular shape at the closed end of slot 34 but tapers in a generally trapezoidal shape at the open end of the slot. The edges 38 of the tapered or free end of bottom plate 32 are preferably bevelled to facilitate guiding the sheet of material 26 into slot 34 for cutting to match an edge or cutout in the underlying sheet 28, as will be explained more fully hereinafter.

The router 12 is mounted in inverted position on the top plate 30 for adjustable lateral positioning of the bit 22 relative to an opening 40 in the top plate. In particular, a mounting collar 42 is secured to the top plate 30 by means of screws 44 extending through oversized holes 46 in the top plate. The heads of screws 44 and washers 48 are located in recessed position within counterbores 50 centered on holes 46. The screws 44 and oversized holes 46, which are locted on generally diametrically opposite sides of collar 42 thus allow for some limited lateral movement and coarse alignment of the router bit 22 with the axis of opening 40. A pair of set screws 52 positioned at generally right angles, coupled between collar 42 and lugs 54 on plate 30, allow for fine alignment of the router bit 22 relative to an offset cam follower in the bottom plate 32.

As illustrated, the lower front portion of collar 42 includes an opening 56 to permit visual inspection and access to the router bit 22. A protective guard 58, which can be formed of clear plastic or other suitable material, is preferably mounted over opening 56 and secured in place with screws 60 or other suitable fasteners for safety purposes to prevent the fingers of the operator from inadvertently coming into contact with the router bit 22.

Referring primarily to FIG. 2, in accordance with the preferred embodiment, the router 12 is mounted in collar 42 for selective vertical positioning between a raised position where the router bit 22 does not protrude through opening 40, and a lowered position where the bit extends a predetermined distance through the opening toward the bottom plate 32. A sleeve 62 is provided on the lower portion of the router housing 16. The sleeve 62, which can be formed of brass or other suitable low-friction material, functions as a bushing to facilitate slideable movement of the router 12 in collar 42. A vertical slot 64 in sleeve 62 and a pair of vertically spaced-apart pins 66 or other suitable guide structure on the inside of the collar 42 constrain the router 12 for vertical movement and against relative rotation within the collar. A ring 68 is threaded to the router housing 16 above sleeve 62. The ring 68, which is secured in place with a set screw 70, includes a peripheral outside groove 72 which is adapted for engagement with a pair of opposing springactuated thumb latches 74 on collar 42.

The adjustment ring 68, which can be threadedly adjusted on the router housing 16, and the thumb latches 74 thus define the raised and lowered positions of the router bit 22 relative to opening 40 in the top plate 30. The router bit 22 is shown in the lowered position, with ring 68 resting on collar 42. The thumb latches 74 are normally spring-biased inwardly against ring 68. In the raised position of router 12, the lower edge of the adjustment ring 68 rests on the inner ends of the thumb latches 74. When the thumb latches 74 are manually actuated outwardly, router 12 drops down until ring 68 rests on the upper edge of collar 42 with the inner ends of thumb latches 74 positioned in groove 72 to positively secure the router in the lowered or cutting position.

This comprises a significant feature of the invention because it permits material 26 to be positioned in slot 34 when the router 12 is raised without interference, after which thumb latches 74 can be actuated without releasing grip on the attachment 10, allowing the router to drop and form a "plunge cut" the bit 22 directly through the material without starting from an edge.

Figure 5:
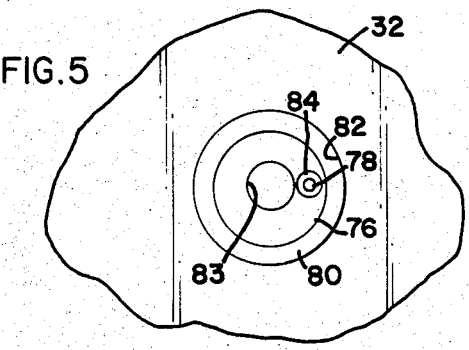
FIG. 5 is an enlarged bottom view of a modification of the offset rotatable cam follower in the router attachment herein.

Referring now to FIGS. 3 and 4, the bottom plate 32 includes a rotatable cam 76 with an offset lobe or cam follower 78 mounted in a bearing 80 pressed into an opening 82 which is preferably concentric with the opening 40 in the top plate 30. The center of the rotatable cam 76 can be solid or drilled out as shown at 83 to facilitate alignment of the router bit 22 so that the outer edge of the router bit is tangential with the inner edge of the offset cam lobe 78. The cam lobe or follower 78 can comprise a small solid pin of generally circular cross section as shown in FIG. 4, or a pin surrounded by a small roller bearing 84 as shown in FIG. 5. The use of roller bearing 84 on the cam follower 78 is desirable when cutting thin sheet material 26, such as veneer. The length of cam follower 78 is preferably less than the thickness of material 28, so that an inlay can be cut after the underlying material has been laminated to a baseboard (not shown). The use of a rotatable cam 76 with an offset follower 78 of the solid pin-type or roller bearing-type comprises another significant feature of the present invention.

Figure 6:
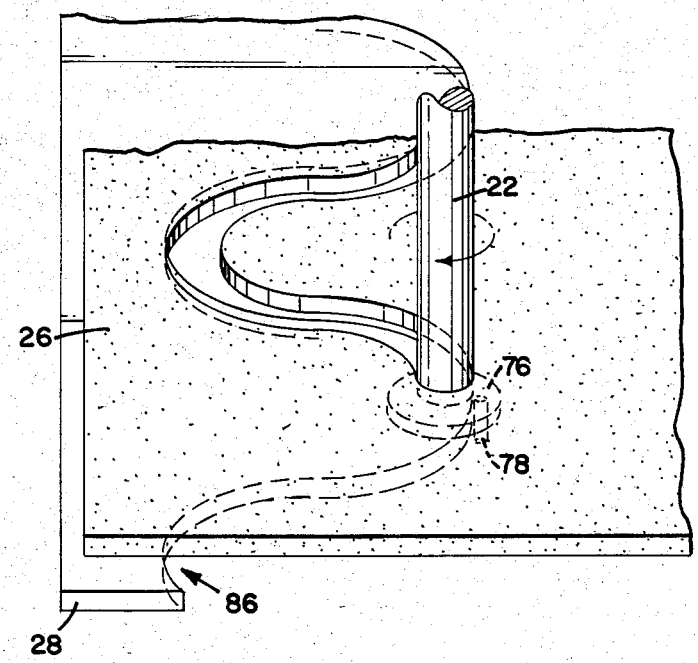
FIG. 6 is an enlarged illustration showing the router attachment herein cutting a sheet of inlay material to fit an edge of a cutout in an underlying sheet of base material.

FIG. 6 illustrates the router bit 22 positioned through material 26 and over a sheet of underlying material 28 with the cam follower 76 located in its outermost rotational position in engagement with the edge of the cutout or seam in the sheet of material 28 to be matched. For purposes of illustration, the underlying sheet of material 28 is shown as a free piece, although it could be a piece of laminate adhesively secured to the top surface of a baseboard, such as a counter top or the like, which has been cut out in the desired pattern and is ready to receive an inlay cut to fit from material 26. The sheet of material 26 overlies the cutout 86 in the underlying sheet 28. The outer edge of the inlay 26 extends into slot 34 where it is cut to fit by the router bit 22 as the offset rotatable cam lobe 78 follows the edge of the cutout 86 in sheet 28. Sheet 28 is typically secured beneath the router attachment 10 and sheet of material 26, however, all that is required to achieve accurate cutting is to urge the router attachment 10 generally toward the outside of the cutout 86 in the underlying sheet 28. There is no need to hold the router attachment 10 at some constant angle, such as a right angle, to the seam or edge being followed, whether it is straight or arcuate, of inside or outside curvature. If held against the seam or edge of the cutout 86 to be followed, the rotatable offset cam follower 78 compensates for this, maintaining the router bit 22 in tangential relationship over a generous range of angular orientation of attachment 10 relative to contour 86. Moreover, the cutting bit 22 typically turns in a clockwise position when looking downward on the router attachment 10, which in turn tends to urge the rotatable offset cam follower 78 outwardly as it "walks" along the edge of the cutout 86 so that minimal guiding of the router attachment by the operator is necessary.

Figure 7:
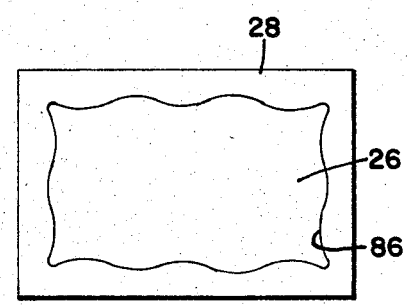
FIG. 7 is an illustration of a piece of inlaid laminate formed with the router attachment of the invention.

FIG. 7 shows an example of a piece of cabinetry, such as a door or counter top, with an inlay cut from material 26 to fit a cutout 86 in material 28 with the router attachment 10 of the invention.

From the foregoing, it will thus be apparent that the present invention comprises an improved router attachment having numerous advantages over the prior art. By means of my router attachment, a sheet of material can be precisely cut to match a seam, edge or cutout of virtually any shape in another sheet of material. The router attachment herein can be used with laminate, veneer, or other types of sheet material for cutting precise inlays in cabinets, counter tops or flooring, or for cutting patches in boat hulls, automotive bodies, aircraft skins, or other types of applications employing sheet material. Other advantages will be evident to those skilled in the art.

Although particular embodiments of the invention have been illustrated in the accompanying drawings and described in the foregoing Detailed Description, it will be understood that the invention is not limited only to the embodiments disclosed, but is intended to embrace any equivalents, alternatives, modifications and/or rearrangements of elements falling within the scope of the invention as defined by the following claims.

What is claimed is:

1. A router attachment, comprising:
   a generally planar top plate having a clearance hole therein;
   a generally planar bottom plate secured in predetermined vertically spaced-apart relationship with the top plate to define a generally horizontal slot therebetween for receiving a first sheet of material to be cut;
   means for adjustably securing a router and bit in inverted relationship to said top plate over the clearance hole therein; and
   a rotatable cam mounted in said bottom plate beneath the clearance hole in said top plate, said cam including an offset depending cam follower mounted for movement therewith for engaging an edge of a second sheet of material.

2. A router attachment, comprising:
   a generally planar top plate having a clearance hole therein;
   a generally planar bottom plate secured in predetermined vertically spaced-apart relationship with the top plate to define a generally horizontal slot therebetween for receiving a first sheet of material to be cut;
   means for adjustably securing a router and bit in inverted relationship to said top plate over the clearance hole therein; and
   a rotatable cam mounted in said bottom plate beneath the clearance hole in said top plate, said cam including an offset depending cam follower for engaging an edge of a second sheet of material;
   said top and bottom plates being formed of aluminum, said top plate being of generally rectangular shape and said bottom plate including opposite rectangular and generally tapered ends with said rotatable cam being mounted in the generally tapered end of said bottom plate.

3. A router attachment, comprising:
   a generally planar top plate having a clearance hole therein;
   a generally planar bottom plate secured in predetermined vertically spaced-apart relationship with the top plate to define a generally horizontal slot therebetween for receiving a first sheet of material to be cut;
   said bottom plate including a tapered end with a bevelled peripheral edge to facilitate receiving the sheet of material to be cut;
   means for adjustably securing a router and bit in inverted relationship to said top plate over the clearance hole therein; and
   a rotatable cam mounted in said bottom plate beneath the clearance hole in said top plate, said cam including an offset depending cam follower for engaging an edge of a second sheet of material.

4. The router attachment of claim 1, wherein said means for adjustably securing a router to said top plate comprises:
   a generally cylindrical collar; and
   screws connected between said collar and said top plate to provide for adjustable lateral positioning of the inverted router in said collar over the clearance hole in said top plate.

5. The router attachment according to claim 4, wherein said means for adjustably securing a router to said top plate further includes:
   a sleeve secured to the inverted router, said sleeve being adapted for sliding engagement within said collar;
   guide structure within said collar adapted for receipt in a slot in said sleeve to guide said router for generally vertical movement while constraining said router against rotation within said collar;
   a positioning ring threaded to the router above said sleeve;
   a set screw for securing the positioning ring in adjustable vertical position on the router; and
   a pair of spring-biased latches mounted on said collar and movable between engaged and disengaged positions with said positioning sleeve for selectively locking the router in predetermined raised and lowered positions.

6. An attachment for a router to facilitate precise cutting of a sheet of inlay material to fit a cutout in a sheet of underlying material, which comprises:
   a top plate having a clearance hole therein;
   a bottom plate secured in predetermined vertically spaced-apart relationship with said top plate to define a generally horizontal slot therebetween for receiving the sheet of inlay material to be cut;
   a collar adapted for receiving the router in inverted relationship;
   means for mounting said collar on said top plate for adjustable lateral positioning of the inverted router over the clearance hole in said top plate; and
   a rotatable cam mounted in said bottom plate beneath the clearance hole in said top plate, said cam including an offset depending cam follower mounted for movement therewith for following an edge of the cutout in the sheet of underlying material so that the router cuts a matching edge in the sheet of inlay material.

7. An attachment for a router to facilitate precise cutting of a sheet of inlay material to fit a cutout in a sheet of underlying material, which comprises:
   a top plate having a clearance hole therein;
   a bottom plate secured in predetermined vertically spaced-apart relationship with said top plate to define a generally horizontal slot therebetween for receiving the sheet of inlay material to be cut;

a collar adapted for receiving the router in inverted relationship;

means for mounting said collar on said top plate for adjustable lateral positioning of the inverted router over the clearance hole in said top plate; and a rotatable cam mounted in said bottom plate beneath the clearance hole in said top plate, said cam including an offset depending cam follower for following an edge of the cutout in the sheet of underlying material so that the router cuts a matching edge in the sheet of inlay material;

said top and bottom plates being formed of aluminum, said top plate being of generally retangular shape and said bottom plate including opposite rectangular and generally tapered ends wth said rotatable cam being mounted in the generally tapered end of said bottom plate.

8. An attachment for a router to facilitate precise cutting of a sheet of inlay material to fit a cutout in a sheet of underlying material, which comprises:

a top plate having a clearance hole therein;

a bottom plate secured in predetermined vertically spaced-apart relationship with said top plate to define a generally horizontal slot therebetween for receiving the sheet of inlay material to be cut;

said bottom plate including a tapered end with a bevelled peripheral edge to facilitate receiving the sheet of material to be cut;

a collar adapted for receiving the router in inverted relationship;

means for mounting said collar on said top plate for adjustable lateral positioning of the inverted router over the clearance hole in said top plate; and a rotatable cam mounted in said bottom plate beneath the clearance hole in said top plate, said cam including an offset depending cam follower for following an edge of the cutout in the sheet of underlying material so that the router cuts a matching edge in the sheet of inlay material.

9. The router attachment of claim 6, further including:

means for securing the router to said mounting collar for selective positioning between predetermined raised and lowered positions.

10. The router attachment of claim 6, further including:

a roller bearing mounted on the cam follower of said cam.

11. An attachment for a router to facilitate precise cutting of a sheet of inlay material to fit an edge in a sheet of underlying material, which comprises:

a top plate having a clearance hole therein;

a bottom plate secured in predetermined vertically spaced-apart relationship with said top plate to define a generally horizontal slot therebetween for receiving the sheet of inlay material to be cut;

a collar;

means for securing the router to said mounting collar in inverted relationship for selective positioning between predetermined raised and lowered positions;

means for mounting said collar on said top plate for adjustable lateral positioning of the inverted router over the clearance hole in said top plate; and a rotatable cam mounted in said bottom plate beneath the clearance hole in said top plate, said cam including an offset depending cam follower mounted for movement therewith for following the edge in the sheet of underlying material so that the router cuts a matching edge in the sheet of inlay material.

12. An attachment for a router having a cutting bit, which comprises:

top plate;

a bottom plate secured in predetermined spaced-apart relationship to said top plate to define a slot therebetween for receiving a first sheet material to be cut;

means for mounting the router on said top plate with the cutting bit thereof extending through a clearance hole in said top plate toward said bottom plate; and an offset depending cam follower rotatably mounted in said bottom plate opposite the clearance hole in said top plate for engaging an edge of an underlying second sheet of material and guiding the router to cut a matching edge in the first sheet of material.

13. The attachment of claim 12, wherein said mounting means is adjustable for lateral positioning of the router over the clearance hole in said top plate, and further including;

means for supporting the router within said mounting means for selective positioning between predetermined raised and lowered positions relative to said top plate.

14. The attachment of claim 12, wherein corresponding ends of said top and bottom plates are of generally rectangular and tapered shapes, respectively, said offset depending cam follower being rotatably mounted in the tapered end of said bottom plate which further includes a bevelled peripheral edge to facilitate receiving the first sheet of material within the slot between said top and bottom plates.

15. The attachment of claim 12, wherein said cam follower comprises a solid pin.

16. The attachment of claim 12, further including:

a roller bearing mounted on said cam follower.

* * * * *